(12) United States Patent
Lee et al.

(10) Patent No.: US 9,154,293 B2
(45) Date of Patent: Oct. 6, 2015

(54) METHOD AND APPARATUS FOR COMPENSATING FOR VARIABLE SYMBOL TIMING USING CYCLIC PREFIX IN NON-SYNCHRONIZED OFDM SYSTEM

(71) Applicant: ELECTRONICS AND TELECOMMUNICATIONS RESEARCH INSTITUTE, Daejeon-si (KR)

(72) Inventors: Jae Ho Lee, Daejeon (KR); Yang Su Kim, Daejeon (KR); Sang Jung Ra, Daejeon (KR); Han Seung Koo, Daejeon (KR); Dong Joon Choi, Daejeon (KR); Nam Ho Hur, Daejeon (KR)

(73) Assignee: ELECTRONICS AND TELECOMMUNICATIONS RESEARCH INSTITUTE, Daejeon-Si (KR)

( * ) Notice: Subject to any disclaimer, the term of this patent is extended or adjusted under 35 U.S.C. 154(b) by 0 days.

(21) Appl. No.: 14/097,440

(22) Filed: Dec. 5, 2013

(65) Prior Publication Data

US 2014/0286468 A1   Sep. 25, 2014

(30) Foreign Application Priority Data

Mar. 20, 2013  (KR) ........................ 10-2013-0029628

(51) Int. Cl.
*H04L 7/033* (2006.01)
*H04L 7/00* (2006.01)
*H04L 27/26* (2006.01)

(52) U.S. Cl.
CPC .......... *H04L 7/0079* (2013.01); *H04L 27/2656* (2013.01); *H04L 27/2663* (2013.01); *H04L 27/2678* (2013.01)

(58) Field of Classification Search
USPC ........... 375/365, 260, 324, 371; 370/280, 335
See application file for complete search history.

(56) References Cited

U.S. PATENT DOCUMENTS

| | | | |
|---|---|---|---|
| 2003/0031274 A1* | 2/2003 | Chen .............................. | 375/324 |
| 2005/0147186 A1* | 7/2005 | Funamoto et al. ............. | 375/324 |
| 2007/0041348 A1* | 2/2007 | Kwun et al. ................... | 370/335 |
| 2007/0160158 A1* | 7/2007 | Zeng et al. ..................... | 375/260 |
| 2009/0154627 A1* | 6/2009 | Park et al. ...................... | 375/365 |
| 2009/0190510 A1* | 7/2009 | Kobayashi ..................... | 370/280 |

FOREIGN PATENT DOCUMENTS

| | | |
|---|---|---|
| KR | 10-2006-0095339 | 8/2006 |
| KR | 10-2008-0012442 | 2/2008 |
| KR | 10-2008-0052144 | 6/2008 |

\* cited by examiner

*Primary Examiner* — Eva Puente
(74) *Attorney, Agent, or Firm* — Kile Park Reed & Houtteman PLLC (57) ABSTRACT

Disclosed are a method and apparatus for estimating symbol timing in a non-synchronized OFDM system. The present invention includes synchronizing a frame of a received signal, estimating the symbol timing of each symbol of the frame based on the synchronization, compensating for the symbol timing using a phase difference attributable to a Symbol Timing Offset (STO), variably changing within a Cyclic Prefix (CP) interval due to the frequency offset of a sampling clock and thermal noise, and performing channel equalization using a preamble based on output including corrected phase rotation.

10 Claims, 11 Drawing Sheets

METHOD AND APPARATUS FOR COMPENSATING FOR VARIABLE SYMBOL TIMING USING CYCLIC PREFIX IN NON-SYNCHRONIZED OFDM SYSTEM

Priority to Korean patent application number 2013-0029628 filed on Mar. 20, 2013, the entire disclosure of which is incorporated by reference herein, is claimed.

BACKGROUND OF THE INVENTION

1. Field of the Invention

The present invention relates to a non-synchronized Orthogonal Frequency Division Multiplexing (OFDM) system and, more particularly, to a method and apparatus for compensating for the performance of a receiver in a non-synchronized OFDM system.

2. Discussion of the Related Art

In an Orthogonal Frequency Division Multiplexing (OFDM) system, a transport frame consists of OFDM symbols and includes a preamble for channel estimation, etc. and a payload including transmission data.

The preamble is generated by performing Inverse Fast Fourier Transform (IFFT) on a sequence known to a transmitter or a receiver. The payload is generated by modulating the transmission data into Quadrature Amplitude Modulation (QAM) symbols and performing IFFT on the symbols.

The transmitter copies the last some samples of an OFDM symbol for the synchronization of the OFDM symbol and attaches the copied samples in front of the OFDM symbol. The samples copied and attached as described above are called a Cyclic Prefix (hereinafter called as a CP).

The receiver performs frame synchronization on a received OFDM signal in order to demodulate a received signal and then estimates OFDM symbol timing.

Since one OFDM symbol is repeated by the length of a CP, the receiver estimates the OFDM symbol timing within the interval of the CP by searching for a minimum value or maximum value of the output of a correlator. At this time, a Symbol Timing Offset (STO) is generated.

The STO generates rotation in the phase of a received QAM symbol, but a Frequency Domain Equalizer (FEQ) can compensate for the rotation of the phase.

In a synchronized OFDM system, since symbol timing is not shifted by the frequency offset of a sampling clock, the estimated symbol timing of the first OFDM symbol of one frame (e.g., a radio frame or a subframe) can be applied to the symbol timing of the remaining OFDM symbols.

In a non-synchronized OFDM system, however, it is necessary to estimate symbol timing in each OFDM symbol because symbol timing is shifted by the frequency offset of a sampling clock due to a lengthened frame.

Furthermore, a variable STO can be generated in an OFDM symbol due to the frequency offset of a sampling clock and thermal noise. The variable STO can generate different phase rotation in each OFDM symbol, and the generated STO is not compensated by an FEQ.

Accordingly, there is a need for a method and apparatus for compensating for rotation in the phase of an OFDM symbol attributable to variable symbol timing.

SUMMARY OF THE INVENTION

An object of the present invention is to provide a method and apparatus for estimating OFDM symbol timing in an OFDM system.

Another object of the present invention is to provide a method and apparatus for controlling a timing shift when estimating OFDM symbol timing in an OFDM system.

Yet another object of the present invention is to provide a method and apparatus for compensating for phase rotation occurring when estimating OFDM symbol timing in an OFDM system.

In accordance with an aspect of the present invention, a method of a reception apparatus estimating symbol timing in a non-synchronized OFDM system includes synchronizing a frame of a received signal, estimating the symbol timing of each symbol of the frame based on the synchronization, compensating for the symbol timing using a phase difference attributable to an STO that is variably changed within a CP interval due to the frequency offset of a sampling clock and thermal noise, and performing channel equalization using a preamble based on output including corrected phase rotation.

In accordance with another aspect of the present invention, a reception apparatus for estimating symbol timing in a non-synchronized OFDM system includes a symbol synchronization unit for obtaining the synchronization of symbols of the frame of a received signal received through a channel, a CP remover for removing a CP inserted into the synchronized symbol, an FFT unit for performing FFT on an OFDM symbol from which the CP has been removed, a symbol timing estimation unit for estimating the transmission and reception timing of a subcarrier in the output of the FFT unit within a CP interval, a phase rotator for correcting rotation in a phase due to an STO occurring when estimating the symbol, and a channel equalizer for obtaining data by performing channel equalization on results having the corrected phase.

DETAILED DESCRIPTION OF THE EMBODIMENTS

Hereinafter, embodiments of the present invention will be described in detail with reference to the accompanying drawings so that they can be readily implemented by those skilled in the art.

Hereinafter, some embodiments of the present invention are described in detail with reference to the accompanying drawings in order for a person having ordinary skill in the art to which the present invention pertains to be able to readily implement the invention. It is to be noted the present invention may be implemented in various ways and is not limited to the following embodiments. Furthermore, in the drawings, parts not related to the present invention are omitted in order to clarify the present invention and the same or similar reference numerals are used to denote the same or similar elements.

The objects and effects of the present invention can be naturally understood or become clear by the following description, and the objects and effects of the present invention are not restricted by the following description only.

The objects, characteristics, and merits will become more apparent from the following detailed description. Furthermore, in describing the present invention, a detailed description of a known art related to the present invention will be omitted if it is deemed to make the gist of the present invention unnecessarily vague. A preferred embodiment in accordance with the present invention is described in detail below with reference to the accompanying drawings.

Figure 1:
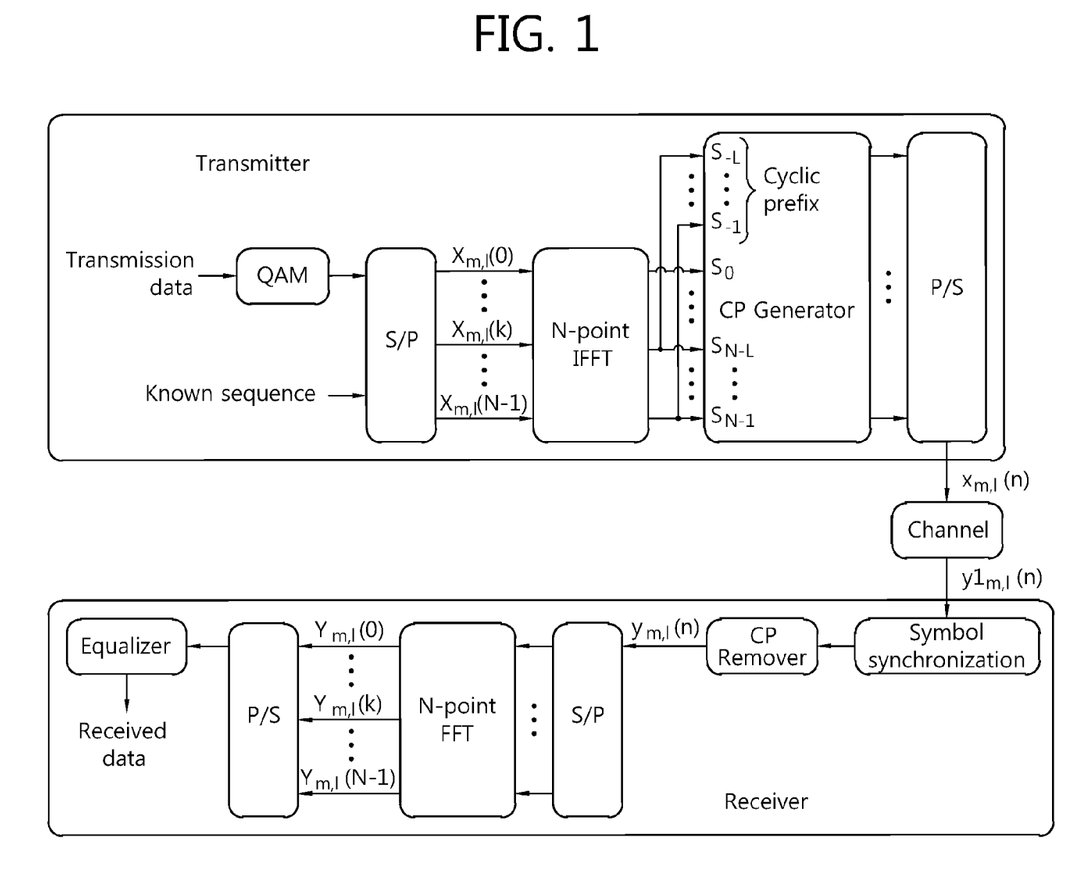
FIG. 1 shows an example of an OFDM system.

FIG. 1 shows an example of an Orthogonal Frequency Division Multiplexing (OFDM) system. The OFDM system can be a system using Inverse Fast Fourier Transform (IFFT) and FFT. Here, a receiver is an example of a receiver for compensating for a phase in accordance with the present invention.

Referring to FIG. 1, a transmitter includes a Quadrature Amplitude Modulation (QAM) unit for performing orthogonal amplitude modulation on transmission data, an IFFT unit for performing IFFT on the resulting data of the QAM unit, and a Cyclic Prefix (CP) generator for generating a CP.

The transmission data is inputted to the QAM unit, and a known sequence is inputted to a Serial/Parallel (S/P) converter in which the sequence is converted from in series to in parallel.

The output of the S/P converter is inputted to the IFFT unit in which IFFT is performed on the received output. For example, the IFFT unit may be an N-point IFFT unit in which N-point IFFT is performed on the received output.

When the results on which IFFT has been performed are inputted to the CP generator, the CP generator generates a CP.

The generated CP is inputted to a Parallel/Serial (P/S) converter. The P/S converter outputs the transmission signal of an OFDM symbol. For example, the transmission signal of an $i^{th}$ OFDM symbol of an $m^{th}$ frame is '$x_{m,i}(n)$'.

A signal (e.g., the OFDM signal) of the transmission signal that is received by the receiver through a channel is '$y1_{m,i}(n)$'.

The receiver includes a symbol synchronization unit for obtaining the synchronization of the OFDM symbols of the OFDM signal, a CP remover for removing an inserted CP, an S/P unit, an FFT unit, and a channel equalizer.

The symbol synchronization unit obtains the synchronization of the OFDM symbols, and the CP remover outputs a signal '$y_{m,i}(n)$' from which a CP has been removed.

The signal '$y_{m,i}(n)$' is inputted to the S/P converter in which the signal is converted in parallel. The converted signal is inputted to the FFT unit (e.g., an N-point FFT unit) in which FFT is performed on the received signal and is then inputted to the P/S converter in which the received signal is converted in series. The serially converted signal is inputted to the channel equalizer.

The transmission data can be obtained from the channel equalizer.

Figure 2:
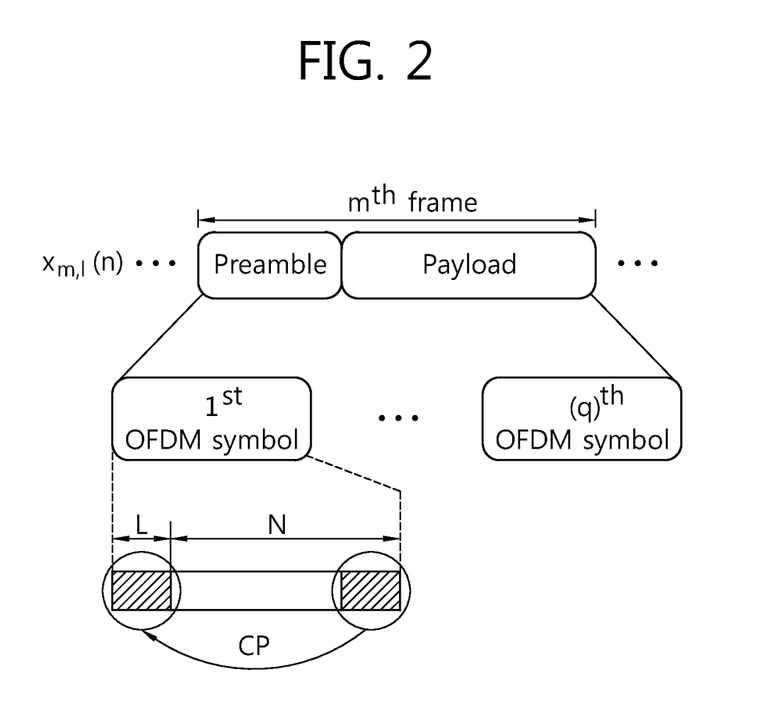
FIG. 2 shows an example of the structure of a frame outputted by a transmitter.

FIG. 2 shows an example of the structure of a frame outputted by a transmitter. It is assumed that the frame is an $m^{th}$ frame.

Referring to FIG. 2, the frame includes a preamble obtained by performing IFFT on a known sequence for the channel equalization of a receiver and a payload obtained by mapping transmission data to be transmitted with QAM symbols and then performing IFFT on the transmission data.

One frame (e.g., a radio frame or subframe) consists of OFDM symbols (e.g., q OFDM symbols), and each OFDM symbol includes (e.g., the last L) CPs formed by copying the rear part of the OFDM symbol.

Figure 3:
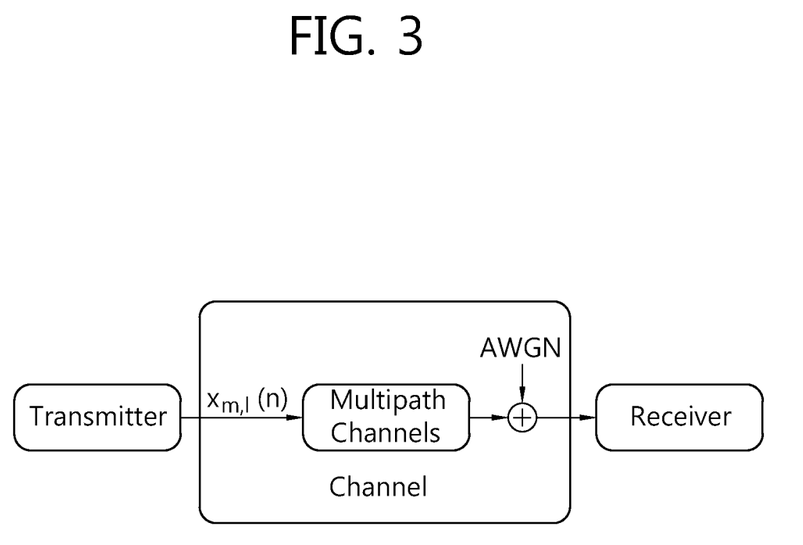
FIG. 3 is a diagram illustrating an example of a channel in which a signal is transmitted from a transmitter to a receiver.

FIG. 3 is a diagram illustrating an example of a channel in which a signal is transmitted from a transmitter to a receiver.

Referring to FIG. 3, the channel includes Additive White Gaussian Noise (AWGN) and a multi-path channel.

For example, the multi-path channel may have a maximum delay time corresponding to 27 samples.

When the transmitter sends a transmission signal '$x_{m,i}(n)$', the transmission signal passes through the multi-path channel within the channel. Next, the transmission signal is combined with AWGN and then transmitted to the receiver.

Figure 4:
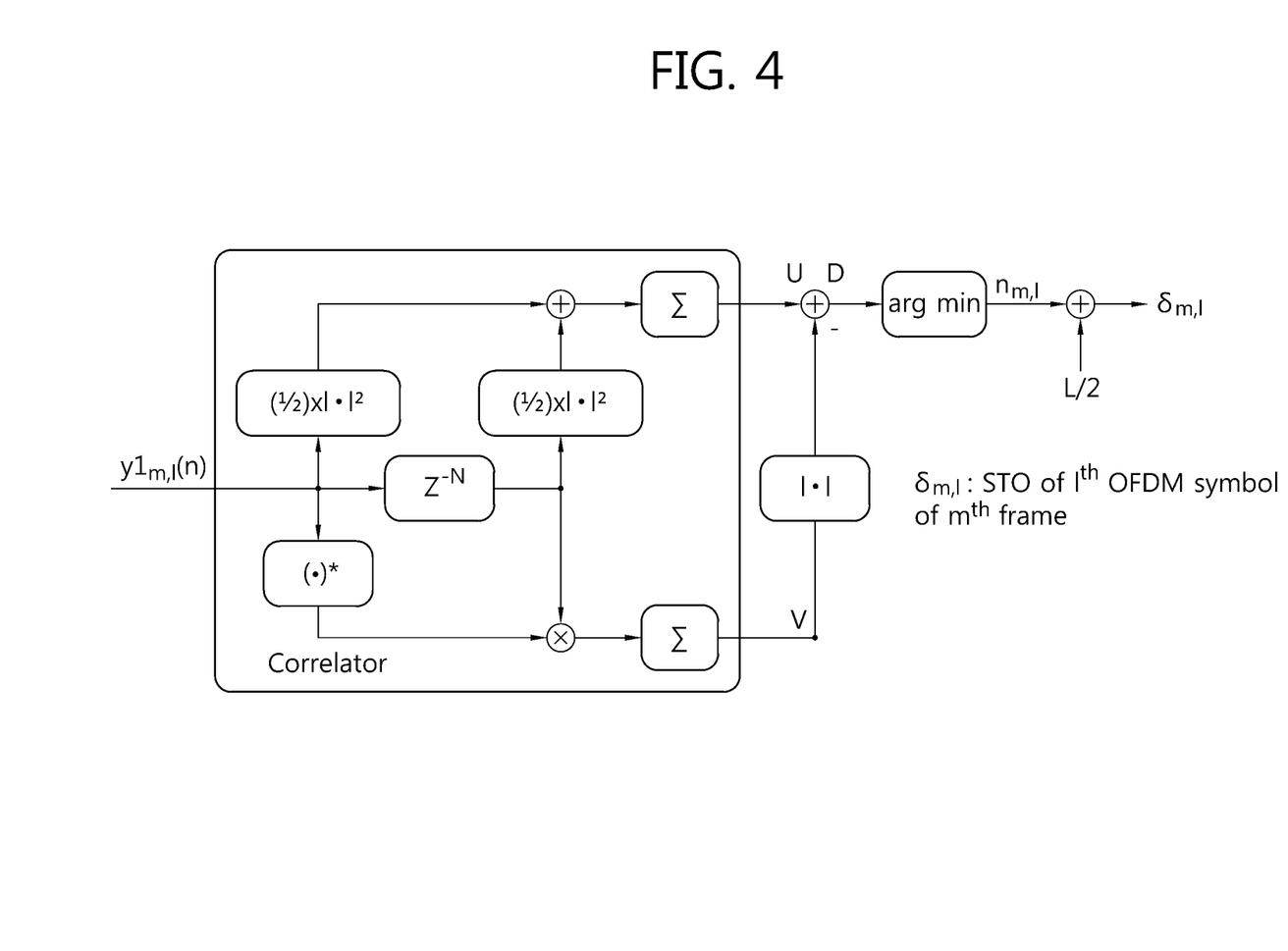
FIG. 4 is a diagram showing an example of a method of a receiver obtaining OFDM symbol timing in accordance with the present invention.

FIG. 4 is a diagram showing an example of a method of a receiver obtaining OFDM symbol timing in accordance with the present invention.

Referring to FIG. 4, the receiver estimates OFDM symbol timing within a CP interval by searching for a minimum value or maximum value of the output of a correlator.

Here, "arg min" is performed in order to search a parameter value of a minimum value of 'D', that is, the output of the correlator within the correlator and a search window.

The output D of the correlator is the same as Equation 1 below.

$$D(n) = U(n) - |V(n)| \qquad \text{[Equation 1]}$$

$$= \frac{1}{L}\sum_{n=0}^{L-1}\left\{\frac{1}{2}|y_{m,i}(n)|^2 + \frac{1}{2}|y_{m,i}(n-N)|^2\right\} -$$

$$\left|\frac{1}{L}\sum_{n=0}^{L-1} y_{m,i}*(n)y_{m,i}(n-N)\right|$$

Referring to Equation 1, '$y_{m,i}(n)$' is an OFDM signal received through a channel, 'L' is the length of a CP, and 'N' is the number of points of IFFT.

Output obtained by performing 'arg min' on the output D obtained through Equation 1 is '$n_{m,i}$'. Here, 'm' means an $m^{th}$ frame, and 'l' means an $i^{th}$ OFDM symbol.

A value obtained by adding 'L/2' to the output '$n_{m,i}$' of 'arg min' is an STO '$\delta_{m,i}$'.

'$\delta_{m,i}$' can be obtained by adding '$n_{m,i}$' and 'L/2' because Inter-Symbol Interference (ISI) is not generated when '$\delta_{m,i}$' is greater than a maximum delay time '$\tau_{max}$' of h(t) that is an impulse response of a multi-path channel.

Figure 5:
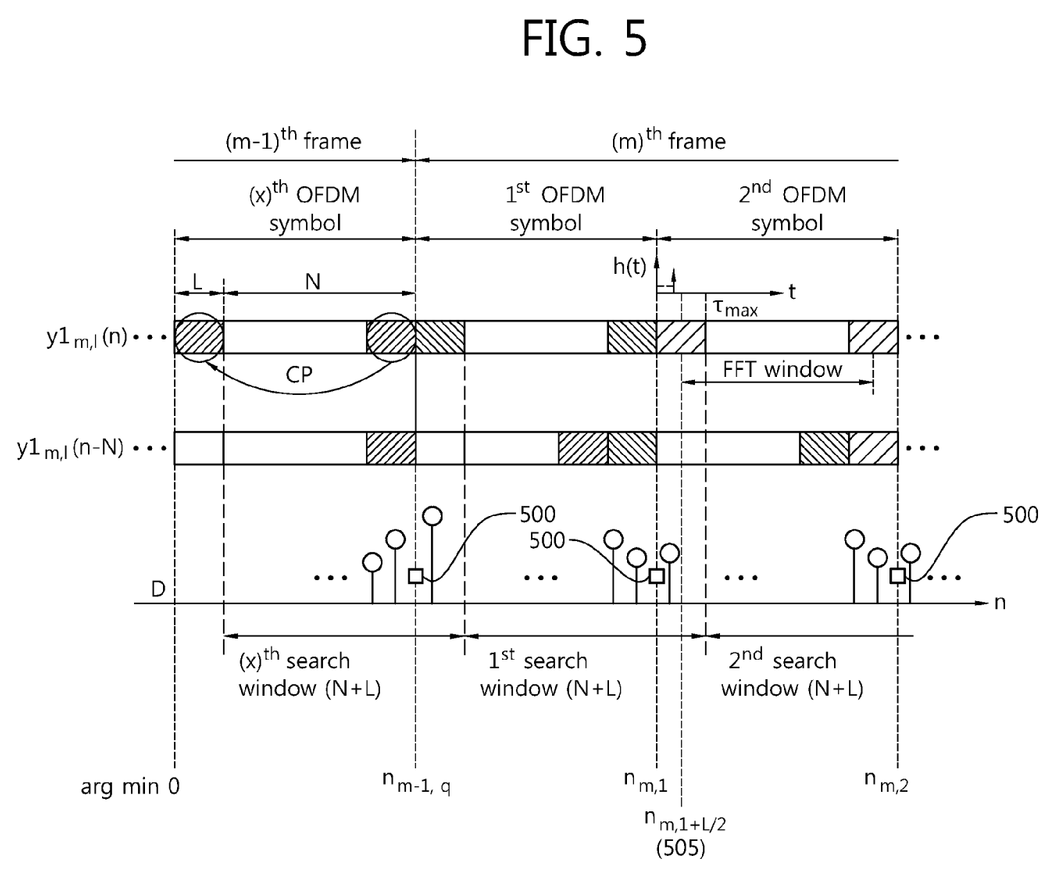
FIG. 5 shows the estimated OFDM symbol timing of a receiver in accordance with the present invention.

FIG. 5 shows the estimated OFDM symbol timing of a receiver in accordance with the present invention.

Referring to FIG. 5, a start point 500 in each OFDM symbol corresponds to '$n_{m,i}$', and an STO 505 '$\delta_{m,i}$' is a value obtained by adding '$n_{m,i}$' and 'L/2'.

The CP remover removes 'L/2' samples of a previous OFDM symbol and 'L/2' CP samples of a current OFDM symbol based on an STO.

The FFT unit receives N samples corresponding to an FFT window.

A received signal '$y_{m,l}(n)$' from which a CP has been removed based on the STO can be obtained as in Equation 2 below.

$$y_{m,l}(n) = \sum_{k=0}^{N-1} X_{m,l}(k)H(k)e^{\frac{j2\pi k(n+\delta_{m,l})}{N}} + z_{m,l}(n) \quad \text{[Equation 2]}$$

$$= \sum_{k=0}^{N-1} X_{m,l}(k)e^{\frac{j2\pi kn}{N}} \underline{H(k)e^{\frac{j2\pi k\delta_{m,l}}{N}}} + z_{m,l}(n)$$

In Equation 2, 'm' is an $m^{th}$ frame, 'l' is an $i^{th}$ OFDM symbol, 'k' is a subcarrier index, '$z_{m,l}(k)$' is noise, 'H(k)' is the frequency response of a multi-path channel, and 'n' is a sample index.

In Equation 2, $$\text{``}\underline{H(k)e^{\frac{j2\pi k\delta_{m,l}}{N}}}\text{''}$$

can be defined as the estimated frequency characteristic '$\hat{H}(k)$' of a channel using a received preamble as in Equation 3.

$$\hat{H}(k) = H(k)e^{\frac{j2\pi k\delta_{m,l}}{N}} \quad \text{[Equation 3]}$$

In the estimated frequency characteristic, a phase is shifted by an STO in the channel frequency characteristic of a $k^{th}$ subcarrier.

Equation 2 can be changed as follows based on Equation 3.

$$y_{m,l}(n) = \sum_{k=0}^{N-1} X_{m,l}(k)e^{\frac{j2\pi kn}{N}} \hat{H}(k) + z_{m,l}(n) \quad \text{[Equation 4]}$$

The FFT output of the received signal '$y_{m,l}(m)$' obtained in Equation 4 is the same as Equation 5 below.

$$Y_{m,l}(p) = \sum_{n=0}^{N-1} y_{m,l}(n)e^{\frac{-j2\pi pn}{N}} + Z_{m,l}(p) \quad \text{[Equation 5]}$$

$$= X_{m,l}(p)\hat{H}(p) + Z_{m,l}(p)$$

$$= X_{m,l}(p)H(p)e^{\frac{-j2\pi p\delta_{m,l}}{N}} + Z_{m,l}(p)$$

$$= \underline{X_{m,l}(p)e^{\frac{-j2\pi p\delta_{m,l}}{N}}} H(p) + Z_{m,l}(p)$$

$$p = 0, \ldots, N-1$$

In Equation 5, $$\text{``}\underline{X_{m,l}(p)e^{\frac{-j2\pi p\delta_{m,l}}{N}}}\text{''}$$

means that the phases of the transmission and reception QAM symbols of $p^{th}$ subcarrier have been rotated depending on an STO.

Figure 6:
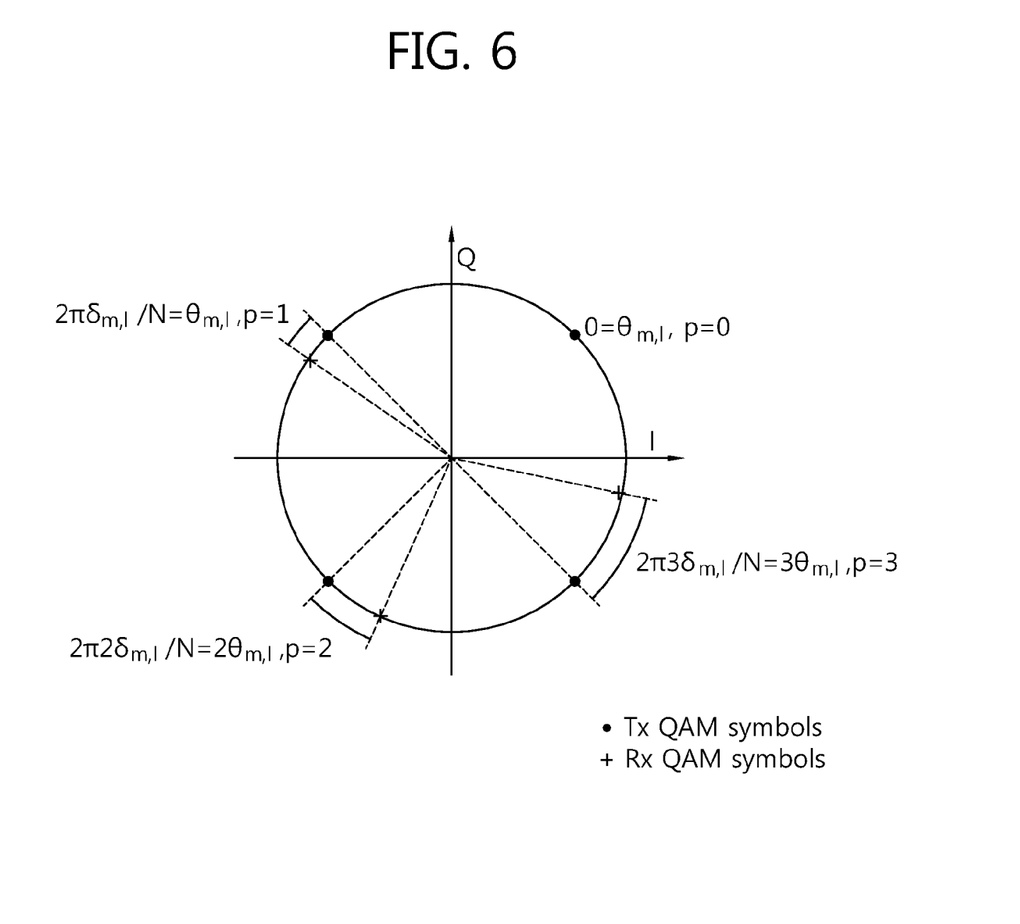
FIG. 6 shows that the phases of transmission and reception QAM symbols of a subcarrier have been rotated depending on an STO in accordance with the present invention.

FIG. 6 shows that the phases of the transmission and reception QAM symbols of a subcarrier have been rotated depending on an STO in accordance with the present invention.

Referring to FIG. 6, it is assumed that a multi-path channel is not present.

'$\delta_{m,l}$' is the STO of an $i^{th}$ OFDM symbol of an $m^{th}$ frame.

It can be interpreted that the phase of the frequency characteristic of a channel is changed by the influence of the STO as in Equation 3.

Or, it can be interpreted that the phase of a transmission QAM symbol is changed by the influence of the STO as in Equation 5. In Equation 5, a case where the STO '$\delta_{m,l}$' is 0 and a case where the STO '$\delta_{m,l}$' is not 0 are described below.

(1) When the STO '$\delta_{m,l}$' is 0

In Equation 5, when the STO '$\delta_{m,l}$' is 0, the FFT output of the received signal is the same as Equation 6 below and the received QAM symbol is the same as Equation 7 below.

$$Y_{m,l}(p) = X_{m,l}(p)H(p) + Z_{m,l}(p) \quad \text{[Equation 6]}$$

$$\tilde{X}_{m,l}(p) = \frac{Y_{m,l}(p)}{H(p)} = X_{m,l}(p) + \frac{Z_{m,l}(p)}{H(p)} \quad \text{[Equation 7]}$$

In Equations 6 and 7, a received QAM symbol is estimated by performing channel equalization using a Least Square (LS) method. That is, the received QAM symbol is estimated by dividing a received signal by a channel. It can be seen that the estimated QAM symbol has a form in which noise has been added to the transmission QAM symbol.

(2) When the STO '$\delta_{m,l}$' is not 0

In Equation 5, when the STO '$\delta_{m,l}$' is not 0, the FFT output of the received signal is the same as Equation 8 below, and the received QAM symbol is the same as Equation 9 below.

$$Y_{m,l}(p) = X_{m,l}(p)\hat{H}(p) + Z_{m,l}(p) \quad \text{[Equation 8]}$$

In Equation 8, the FFT output of the received signal has a linear phase component proportional to the STO '$\delta_{m,l}$' according to a subcarrier index.

Figure 7:
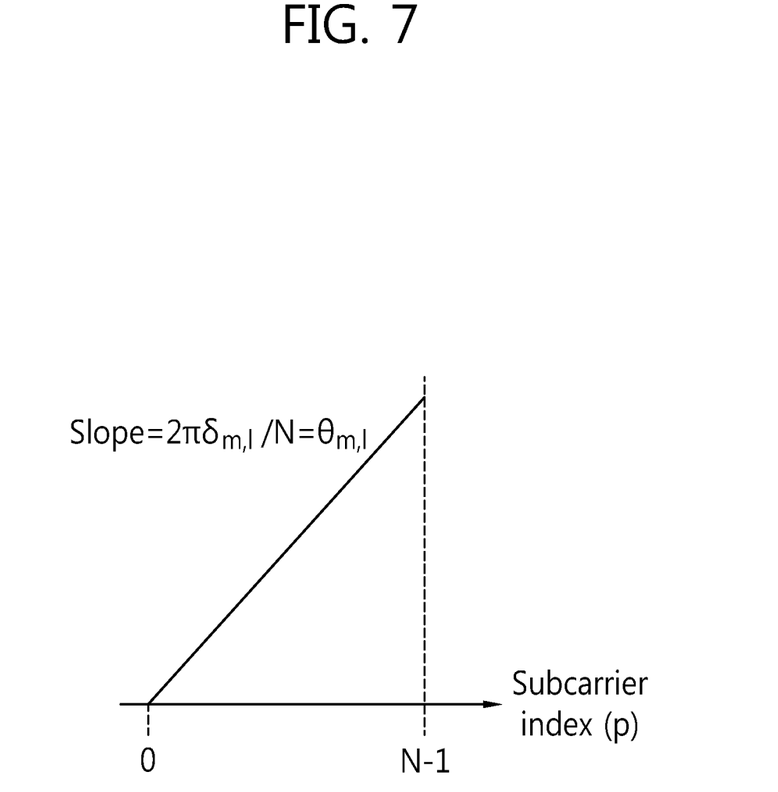
FIG. 7 shows the FFT output of a received signal when STO is not 0.

FIG. 7 shows the FFT output of the received signal when the STO is not 0. From FIG. 7, it can be seen that the FFT output of the received signal has a linear phase component proportional to the STO '$\delta_{m,l}$' according to a subcarrier index.

$$\hat{X}_{m,l}(p) = \frac{Y_{m,l}(p)}{\hat{H}(p)} = X_{m,l}(p) + \frac{Z_{m,l}(p)}{\hat{H}(p)} \quad \text{[Equation 9]}$$

In Equation 9, the received QAM symbol is estimated by dividing the received signal by an estimated channel. The estimated QAM symbol has a form in which noise has been added to the transmission QAM symbol as in Equation 7.

From Equations 3 and 9, it can be seen that the estimated QAM symbol is the same as the transmission QAM symbol if STOs are the same within one frame.

If the estimated QAM symbol is not the same as the transmission QAM symbol, the phase of the estimated QAM symbol is rotated although channel equalization is performed on the estimated QAM symbol.

Figure 8:
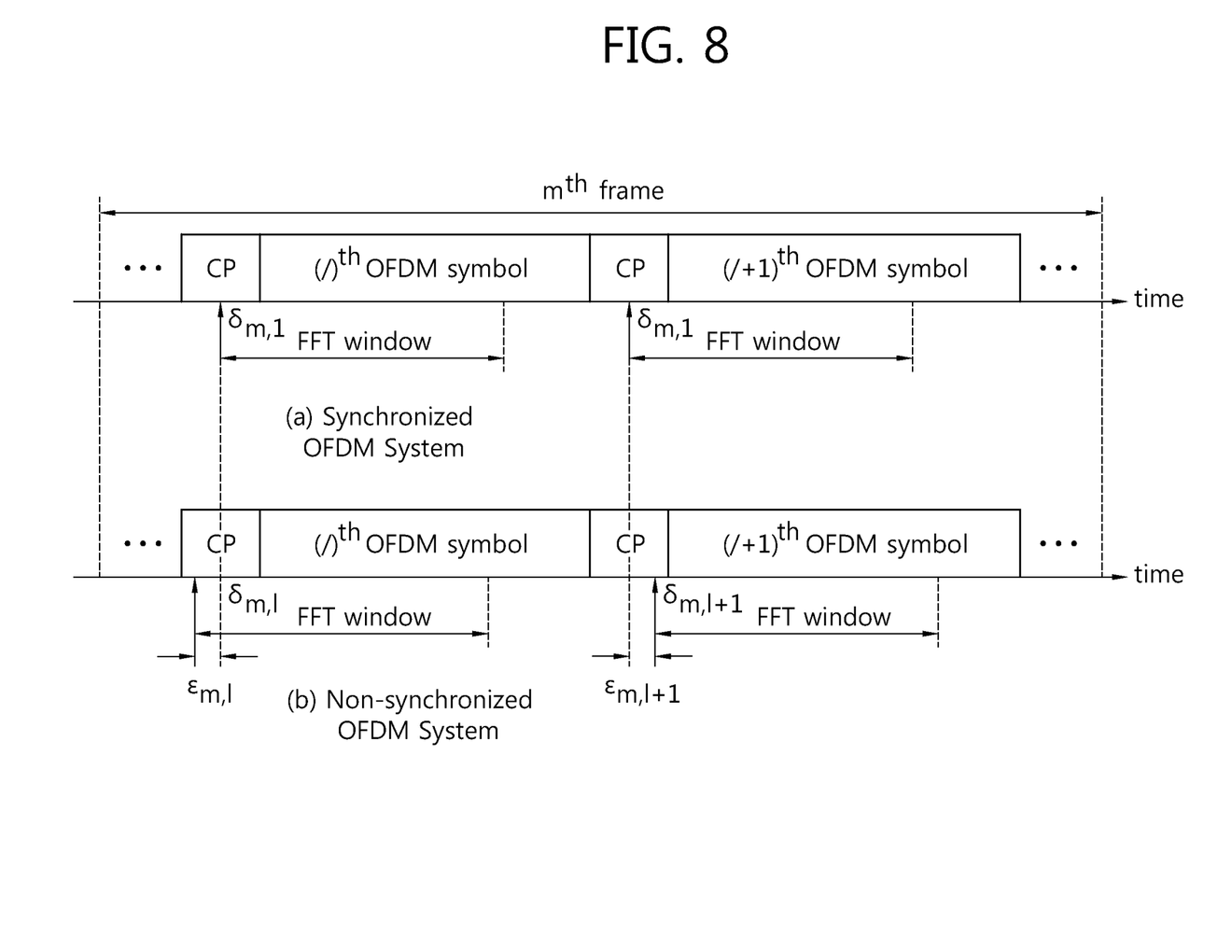
FIG. 8 shows an example in which reception QAM symbols are estimated in synchronized and non-synchronized OFDM systems.

FIG. 8 shows an example in which reception QAM symbols are estimated in synchronized and non-synchronized OFDM systems.

Referring to FIG. 8, in a synchronized OFDM system (a), all OFDM symbols within one frame have the same STO, and a reception QAM symbol can be precisely estimated by performing channel equalization as in Equation 9.

In a non-synchronized OFDM system (b), a difference '$\epsilon_{m,l+1}$' is generated between the STO of a first OFDM symbol and the STO of an (l+1)$^{th}$ OFDM symbol. This is because a frequency offset is present between transmission and reception clocks.

Accordingly, symbol timing needs to be estimated in each OFDM symbol of one frame in order to estimate symbol timing due to the frequency offset between the transmission and reception clocks.

Here, a difference '$\epsilon_{m,l+1}$' is generated between the STO of an l$^{th}$ OFDM symbol and the STO of the first OFDM symbol owing to thermal noise. That is, if symbol timing is estimated in each OFDM symbol within one frame, the STO of each OFDM symbol may vary.

In this case, although channel equalization is performed, the phase of the received QAM symbol is rotated by '$\epsilon_{m,l}$' and '$\epsilon_{m,l+i}$'. As a result, a reception Bit Error Rate (BER) is increased.

In order to solve this problem, in the present invention, in a non-synchronized OFDM system, FFT output is compensated for by a phase difference between an STO estimated every OFDM symbol and the STO of a first OFDM symbol. This is the same as Equation 10 below. Accordingly, a variable STO using a CP can be compensated for.

$$Y_{m,l}(p) \times e^{\frac{j2\pi p(\delta_{m,1}-\delta_{m,l})}{N}} \quad l=2,\ldots,q \qquad \text{[Equation 10]}$$

In Equation 10, 'm' is a frame index, 'l' is an OFDM symbol index of the frame, and '$\delta_{m,1}$' is the STO of the first OFDM symbol of the m$^{th}$ frame.

Furthermore, $$`e^{\frac{j2\pi p(\delta_{m,1}-\delta_{m,l})}{N}}`,$$

is a part having a phase rotated by a phase rotator.

Figure 9:
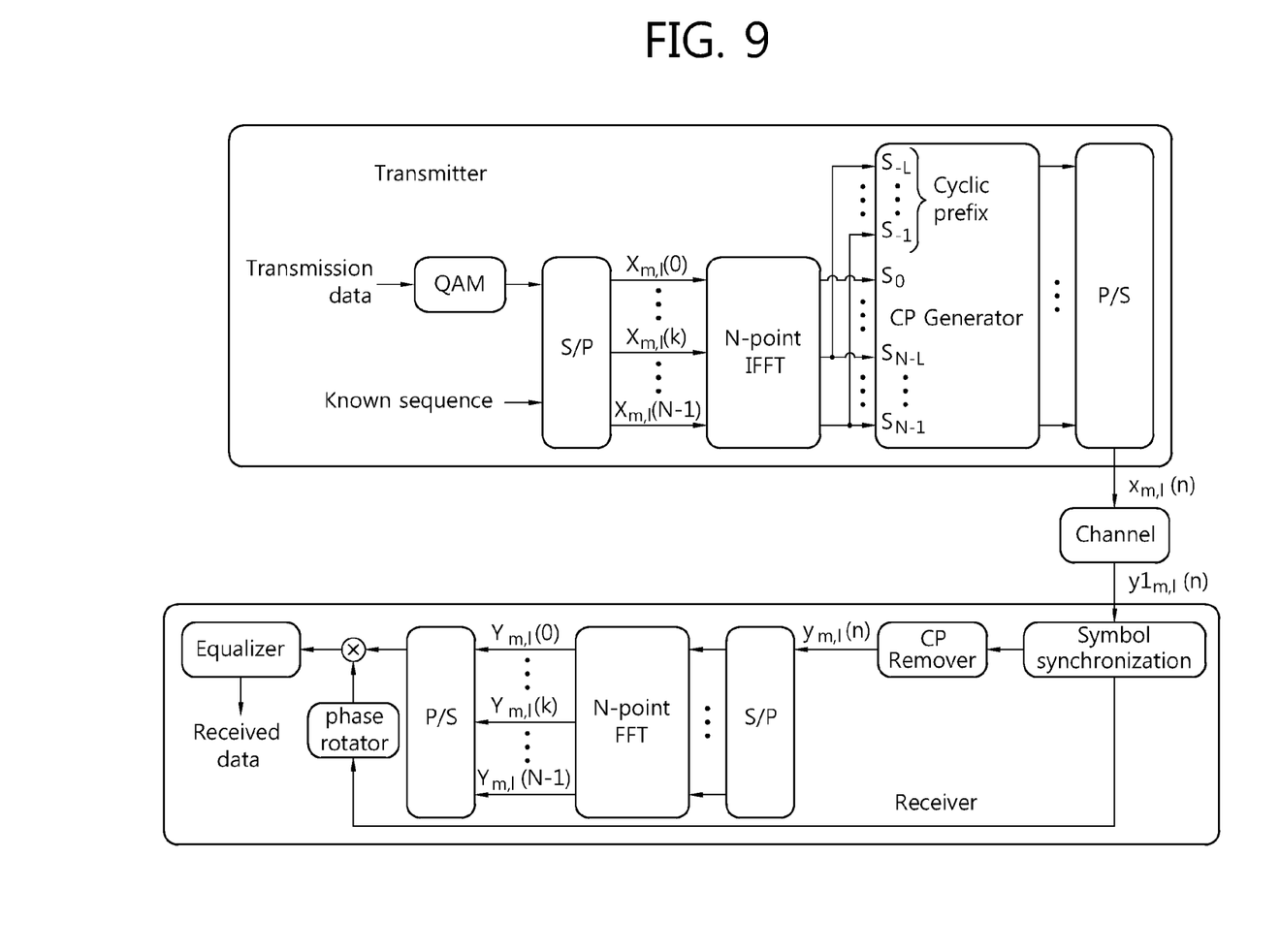
FIG. 9 shows another example in which a receiver compensates for a phase in accordance with the present invention.

FIG. 9 shows another example in which a receiver compensates for a phase in accordance with the present invention.

The receiver of FIG. 9 further includes a phase rotator as compared with the receiver of FIG. 1.

The phase rotator can compensate for a variable STO using a CP by compensating for FFT output using a phase difference as in the above Equation.

For another example, the symbol timing compensation apparatus (or the receiver) can include a symbol synchronization unit for obtaining the synchronization of the symbols of a frame of a received signal received through a channel, a CP remover for removing a CP inserted into the synchronized symbol, an FFT unit for performing FFT on an OFDM symbol from which the CP has been removed, a symbol timing estimation unit for estimating the transmission and reception timing of a subcarrier in FFT output within a CP interval, a phase rotator for compensating for the phase of a symbol rotated by an STO generated when estimating the symbol, and a channel equalizer for obtaining data by performing channel equalization on the results of the phase compensation.

Figure 10:
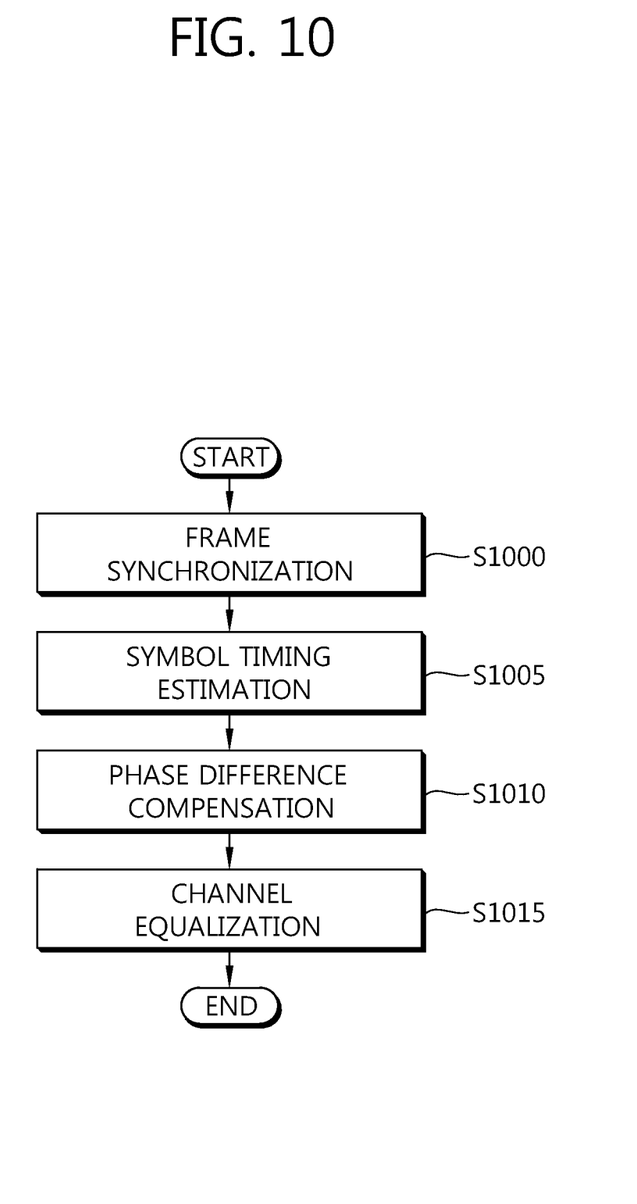
FIG. 10 is a flowchart illustrating an example of a method in which a reception apparatus compensates for a phase in accordance with the present invention.

FIG. 10 is a flowchart illustrating an example of a method in which the receiver compensates for a phase in accordance with the present invention.

Referring to FIG. 10, when a signal is received, the receiver synchronizes the frame of the received signal at step S1000. Here, the frame can include a preamble for estimating symbol timing.

The receiver estimates the symbol timing of each of the symbols of the frame based on the synchronization at step S1005.

For example, the symbol timing can be estimated within a Cyclic Prefix (CP) interval based on a minimum value or maximum value of the output of the correlator.

The receiver compensates for the estimated symbol timing using a phase difference attributable to an STO, variably changing within the CP interval due to the frequency offset of a sampling clock and thermal noise, at step S1010.

For example, the receiver can compensate for FFT output using a phase difference between an STO estimated in each symbol of the frame and the STO of the first symbol of the frame.

For another example, the receiver can compensate for the phase difference using automatic gain control.

After the step S1010, the receiver performs channel equalization based on the symbol timing having corrected phase rotation at step S1015.

Figure 11:
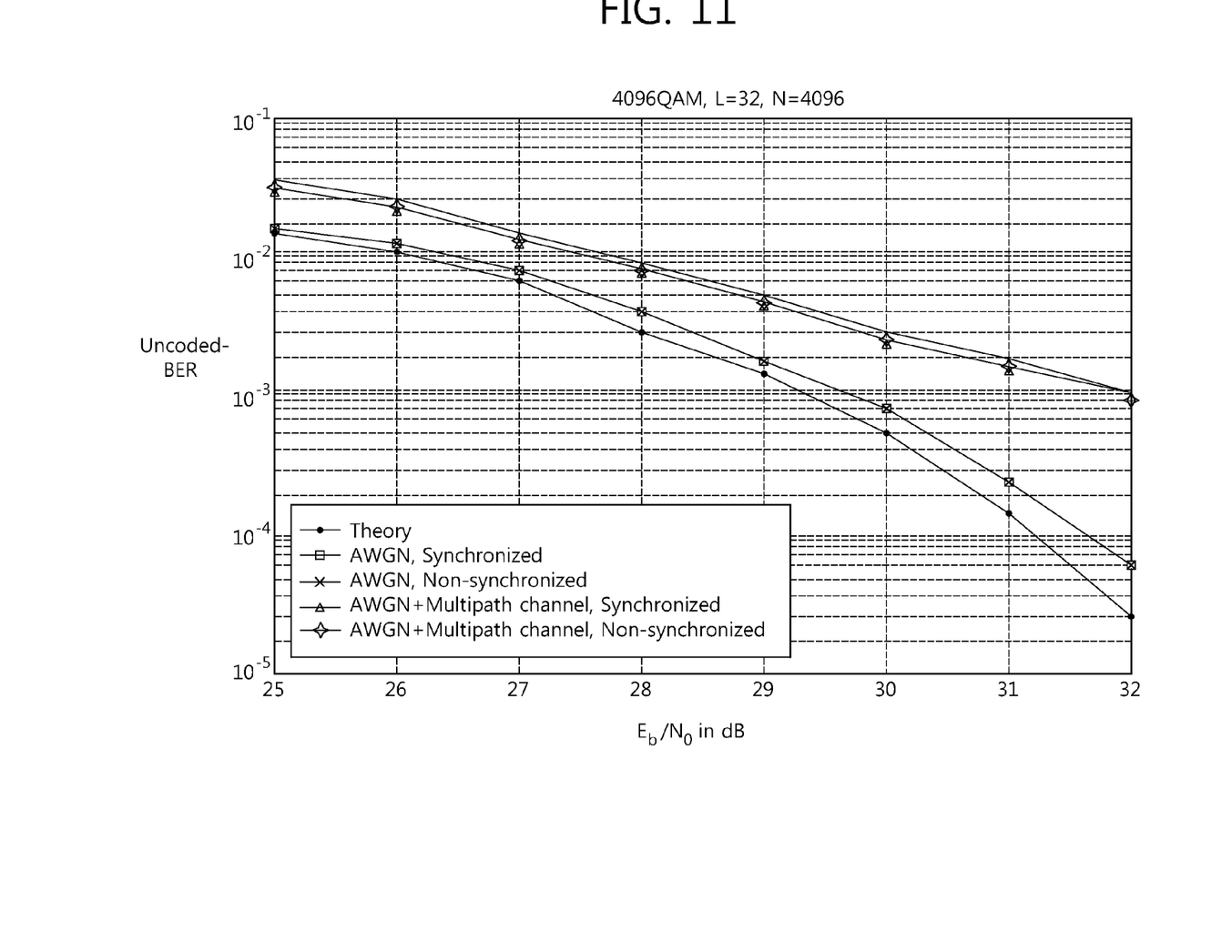
FIG. 11 shows simulation results of phase rotation in accordance with the present invention.

FIG. 11 shows simulation results of phase rotation in accordance with the present invention.

A case where STOs are the same in a synchronized OFDM system is compared with a case where STOs are different in a non-synchronized OFDM system.

The simulation results are results corresponding to a comparison between 'uncoded-BERs'.

In simulation conditions, '4096 QAM' was used, 'N' was 4096, and 'L' was 32 samples.

A transmitter generates a preamble by inserting a pilot into every 6 subcarriers, and a receiver estimates the channel of a subcarrier to which a pilot has not been allocated using a primary interpolation filter.

Referring to FIG. 11, 'Theory' is a theoretical uncoded-BER value of '4096 QAM' of an AWGN channel.

'synchronized' are uncoded-BER values of the synchronized OFDM system.

'non-synchronized' are uncoded-BER values of the non-synchronized OFDM system.

From FIG. 11, it can be seen that both the 'synchronized' and 'non-synchronized' of 'AWGN' are higher than the theoretical uncoded-BER. This is due to an STO.

In the case of the multi-path channels, both the 'synchronized' and the 'non-synchronized' are higher than the theoretical uncoded-BER. This is because Inter-Symbol Interference (ISI) was generated since an estimated STO is shorter than a maximum delay time of the multi-path channel.

In the case of the AWGN and the AWGN+multi-path channel, the synchronized OFDM system and the non-synchronized OFDM system have the same uncoded-BER.

Accordingly, it can be seen that a phase has been corrected in accordance with the present invention.

In accordance with the present invention, the performance of an OFDM receiver using high-degree orthogonal amplitude modulation can be improved because a reduction in the performance of the OFDM receiver attributable to gain mismatching is prevented.

In accordance with the present invention, the Bit Error Rate (BER) of a receiver can be improved by correcting the phase rotation of all OFDM symbols attributable to a variable STO.

A person having ordinary skill in the art to which the present invention pertains may change and modify the present invention in various ways without departing from the technical spirit of the present invention. Accordingly, the present invention is not limited to the above-described embodiments and the accompanying drawings.

In the above exemplary system, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the present invention.

What is claimed is:

1. A method of a reception apparatus estimating symbol timing in a non-synchronized orthogonal frequency division multiplexing system, the method comprising:
    synchronizing a frame of a received signal;
    estimating symbol timing of each symbol of the frame based on the synchronization;
    correcting phase rotation of the symbol timing by compensating for the symbol timing using a phase difference attributable to a symbol timing offset that is variably changed within a cyclic prefix interval due to a frequency offset of a sampling clock and thermal noise; and
    performing channel equalization based on the symbol timing having corrected phase rotation.

2. The method of claim 1, wherein compensating for the symbol timing using the phase difference comprises compensating for a fast fourier transform output using a phase difference between a system timing offset, estimated in each symbol of the frame, and a symbol timing offset of a first symbol of the frame.

3. The method of claim 2, wherein the symbol timing is estimated within a cyclic prefix interval based on a minimum value or a maximum value of an output of a correlator.

4. The method of claim 1, wherein the frame comprises a preamble for estimating the symbol timing.

5. The method of claim 1, wherein compensating for the symbol timing using the phase difference comprises compensating for the phase difference using automatic gain control.

6. A reception apparatus for estimating symbol timing in a non-synchronized orthogonal frequency division multiplexing system, comprising:
    a symbol synchronization unit that receives a signal through a channel and obtains synchronization of symbols of a frame of the received signal received through the channel and outputs a signal from which the symbols are synchronized;
    a cyclic prefix remover that receives the signal from which the symbols are synchronized from the symbol synchronization unit and removes a cyclic prefix inserted into the synchronized symbol and outputs a signal from which the cyclic prefix has been removed;
    a fast fourier transform unit that receives the signal from which the cyclic prefix has been removed from the cyclic prefix remover and performs fast fourier transform on an orthogonal frequency division multiplexing symbol from which the cyclic prefix has been removed and outputs a signal from which fast fourier transform has been performed;
    a symbol timing estimation unit that receives the signal from which fast fourier transform has been performed from the fast fourier transform unit and estimates transmission and reception timing of a subcarrier in an output of the fast fourier transform unit within a cyclic prefix interval and outputs a signal from which symbol timing has been estimated;
    a phase rotator that receives the signal from which symbol timing has been estimated from the symbol timing estimation unit and corrects rotation in a phase due to a symbol timing offset occurring when estimating the symbol and outputs a signal from which rotation in the phase has been corrected; and
    a channel equalizer that receives the signal from which rotation in the phase has been corrected from the phase rotator and obtains data by performing channel equalization on results having the corrected phase.

7. The reception apparatus of claim 6, wherein the phase rotator compensates for the output of the fast fourier transform unit using a phase difference between a system timing offset, estimated in each symbol of the frame, and a system timing offset of a first symbol of the frame.

8. The reception apparatus of claim 6, wherein the symbol timing estimation unit estimates the symbol timing within a cyclic prefix interval based on a minimum value or maximum value of an output of a correlator.

9. The reception apparatus of claim 6, wherein the phase rotator rotates a phase according to Equation below $$Y_{m,l}(p) \times e^{\frac{j2\pi p(\delta_{m,1} - \delta_{m,l})}{N}}$$ [Equation]

wherein '$Y_{m,l}(p)$' is the received signal, 'm' is an index of the frame, 'l' is an orthogonal frequency division multiplexing symbol index of the frame, '$\delta_{m,l}$' is a system timing offset of a first orthogonal frequency division multiplexing symbol of an $m^{th}$ frame, '$\delta m,l$' is a system timing offset of an $i^{th}$ orthogonal frequency division multiplexing symbol of the $m^{th}$ frame, N is a number of points of inverse fast fourier transform, and p is a subcarrier number.

10. The reception apparatus of claim 6, wherein the phase rotator compensates for a phase difference using automatic gain control, wherein the phase difference attributable to a symbol timing offset that is variably changed within a cyclic prefix interval due to a frequency offset of a sampling clock and thermal noise.

* * * * *